June 24, 1947.                P. C. TEMPLE                2,422,758
                  MANUAL CONTROL VALVE FOR REGULATORS
                    Filed Jan. 12, 1944        5 Sheets-Sheet 1

Inventor
PAUL C. TEMPLE
By Albert G. Blodgett
Attorney

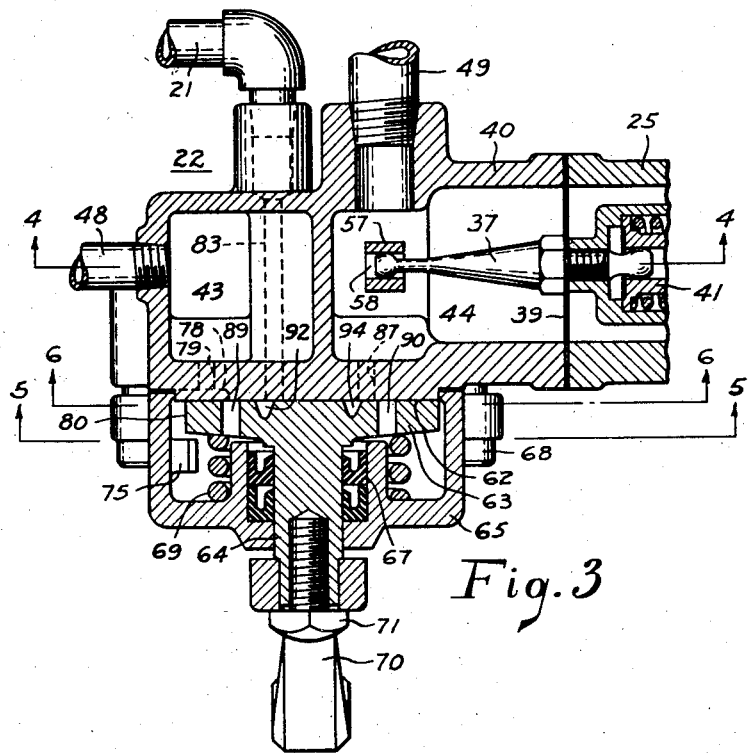
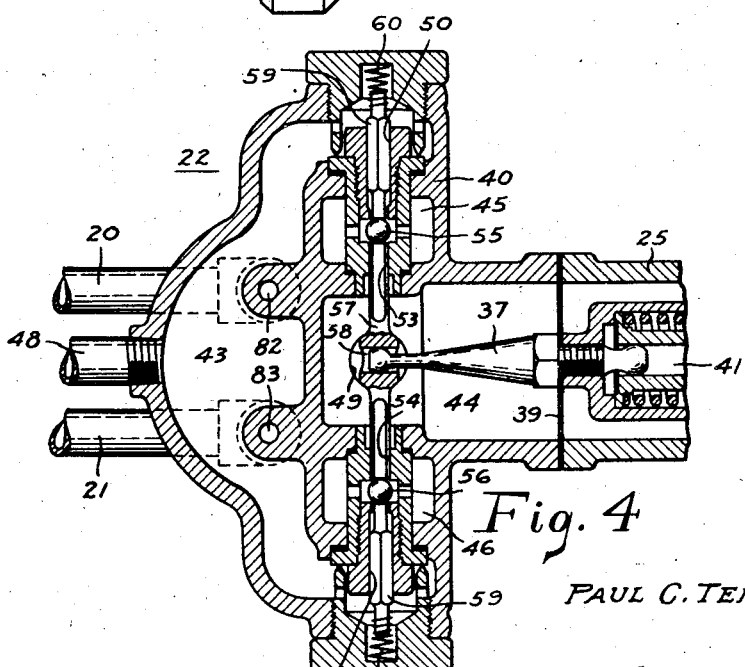

June 24, 1947. P. C. TEMPLE 2,422,758
MANUAL CONTROL VALVE FOR REGULATORS
Filed Jan. 12, 1944 5 Sheets-Sheet 3

Inventor
PAUL C. TEMPLE
By Albert G. Blodgett
Attorney

June 24, 1947.    P. C. TEMPLE    2,422,758
MANUAL CONTROL VALVE FOR REGULATORS
Filed Jan. 12, 1944    5 Sheets-Sheet 4

Inventor
PAUL C. TEMPLE

By Albert G. Blodgett
Attorney

June 24, 1947.  P. C. TEMPLE  2,422,758
MANUAL CONTROL VALVE FOR REGULATORS
Filed Jan. 12, 1944  5 Sheets-Sheet 5

Inventor
PAUL C. TEMPLE
By Albert G. Blodgett
Attorney

Patented June 24, 1947

2,422,758

UNITED STATES PATENT OFFICE 2,422,758

MANUAL CONTROL VALVE FOR REGULATORS

Paul C. Temple, Decatur, Ill., assignor to A. W. Cash Company, Decatur, Ill., a corporation of Delaware Application January 12, 1944, Serial No. 517,956

3 Claims. (Cl. 121—46.5)

This invention relates to regulators, and more particularly to regulators of the type having valve mechanisms to control the flow of pressure fluid for operation of fluid motors.

Apparatus of this general construction is frequently utilized for the actuation of valves, dampers, rheostats and similar control devices. Ordinarily the regulator operates automatically in response to variations in a control impulse produced by changes in fluid flow, fluid pressure, temperature, speed of rotation, or the like. However, there are times when it is highly desirable for the operator to regulate the control device manually and entirely independently of the automatically responsive elements.

It is accordingly one object of the invention to provide a comparatively simple and dependable regulator adapted to supply pressure fluid for actuation of a fluid motor with either automatic or manual control as selected.

It is a further object of the invention to provide a regulator adapted for fluid motor control and including a simple and compact valve mechanism so arranged that the control may be either automatic or manual as the operator may select.

With these and other objects in view, as will be apparent to those skilled in the art, the invention resides in the combination of parts set forth in the specification and covered by the claims appended hereto.

Referring to the drawings illustrating one embodiment of the invention, and in which like reference numerals indicate like parts, Fig. 1 is an elevation of a regulating system for the control of fluid flow, certain parts being shown in section;

Fig. 3 is a section on the line 3—3 of Fig. 2;

Fig. 4 is a section on the line 4—4 of Fig. 3;

Figure 1:
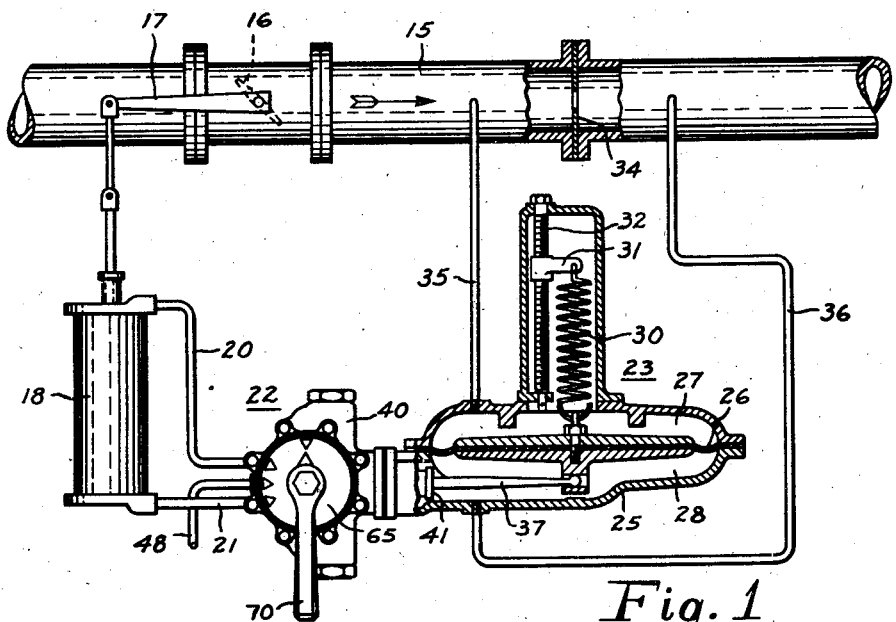

Referring first to Fig. 1, there is shown a pipe or conduit 15 through which fluid flows in the direction of the arrow. The rate of flow is controlled by a valve or damper 16 having an operating arm 17 to which there is connected a fluid motor 18 of the well-known cylinder and piston type. The opposite ends of this motor are connected by means of pipes 20 and 21 to a valve mechanism 22 forming a part of a regulator 23, this regulator being similar in certain respects to that disclosed in my prior Patent No. 1,992,048, granted February 19, 1935. The regulator 23 includes a casing 25 which is divided internally by a flexible diaphragm 26 into an upper chamber 27 and a lower chamber 28. This diaphragm is biased upwardly by a tension spring 30, the upper end of this spring being attached to a nut 31 which is adjustable vertically by means of a screw 32. In order to obtain a differential fluid pressure which will serve as a measure of the rate of flow in the main pipe 15, this pipe is provided with an orifice plate 34. The upper chamber 27 of the regulator is connected by a conduit 35 with the pipe 15 anterior to this orifice plate, and the lower chamber 28 is connected by a conduit 36 with the pipe 15 posterior to the orifice plate. Thus the diaphragm will move in response to variations in the pressure differential. The diaphragm serves to actuate a horizontal lever 37 located therebeneath.

Referring now to Figs. 3 and 4, it will be seen that the lever 37 is pivotally supported by a small flexible diaphragm 39 which is clamped at its periphery between the regulator casing 25 and the casing 40 of the valve mechanism 22. This diaphragm 39 serves both as a fulcrum for the lever and as a dividing wall between the chamber 28 and the interior of the casing 40. The lever 37 is provided with a yieldable joint 41 of the type disclosed in my prior Patent No. 2,099,244, granted November 16, 1937. The interior of the casing 40 is divided by suitable partitions into an inlet chamber 43, an exhaust chamber 44, and two intermediate chambers 45 and 46. The exhaust chamber is located between the intermediate chambers, and the inlet chamber is U-shaped and arranged with its end portions adjacent to the intermediate chambers. A pipe 48 serves to deliver a suitable pressure fluid, such as oil, to the inlet chamber 43. An exhaust pipe 49 receives oil from the exhaust chamber 44. Inlet ports or passages 50 and 51 connect the inlet chamber 43 with the intermediate chambers 45 and 46 respectively, and exhaust ports or passages 53 and 54 connect the exhaust chamber 44 with the intermediate chambers 45 and 46 respectively. These ports 50, 51, 53 and 54 are arranged in direct axial alignment.

The flow of fluid through the casing 40 is controlled by two spherically shaped valves 55 and 56. Valve 55 is located between ports 50 and 51, and valve 56 is located between ports 53 and 54. These valves are controlled by a reciprocable valve stem 57 having its end portions slidable in the exhaust ports 53 and 54 and so shaped as not to block these ports completely. The central portion of the valve stem 57 is provided with a recess 58 to receive the adjacent end of the lever 37. Within each of the inlet ports 50 and 51 there is mounted a slidable pin 59 which is urged toward the corresponding valve by a light spring 60. These pins 59 are so shaped as not to block the ports completely. To facilitate manufacture and assembly, the various inlet and exhaust ports are formed in separate parts which it is thought unnecessary to describe herein, since the construction thereof is fully disclosed in my above-mentioned Patent No. 1,992,048.

Figure 2:
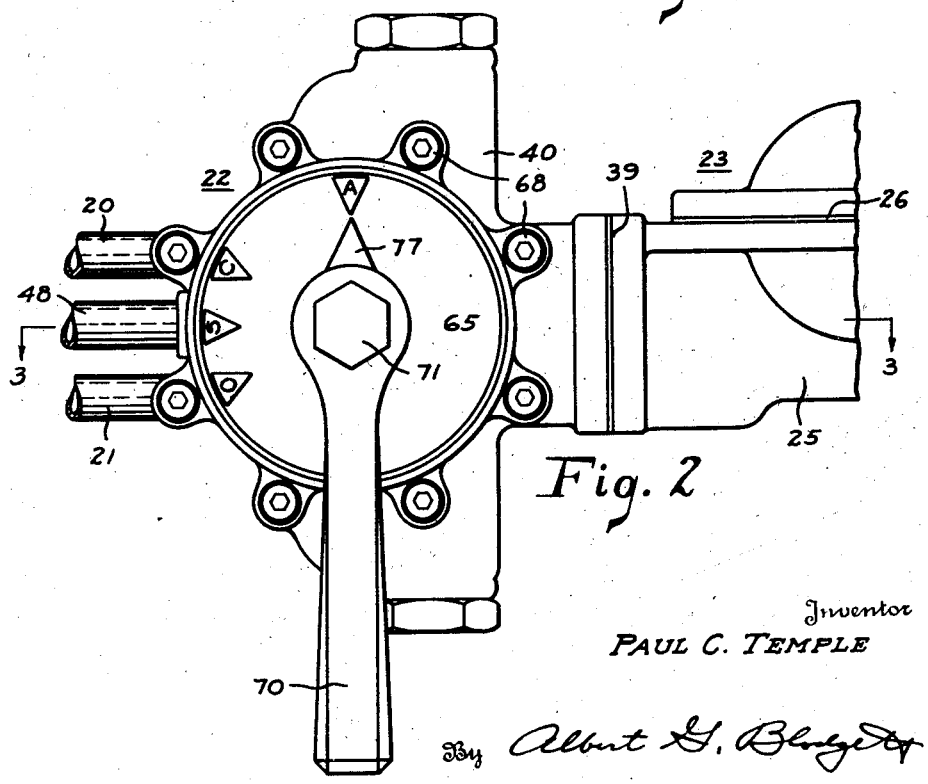
Fig. 2 is an enlarged elevation of a valve mechanism forming a portion of the apparatus shown in Fig. 1, the control handle being shown in its "automatic position.
Figure 5:
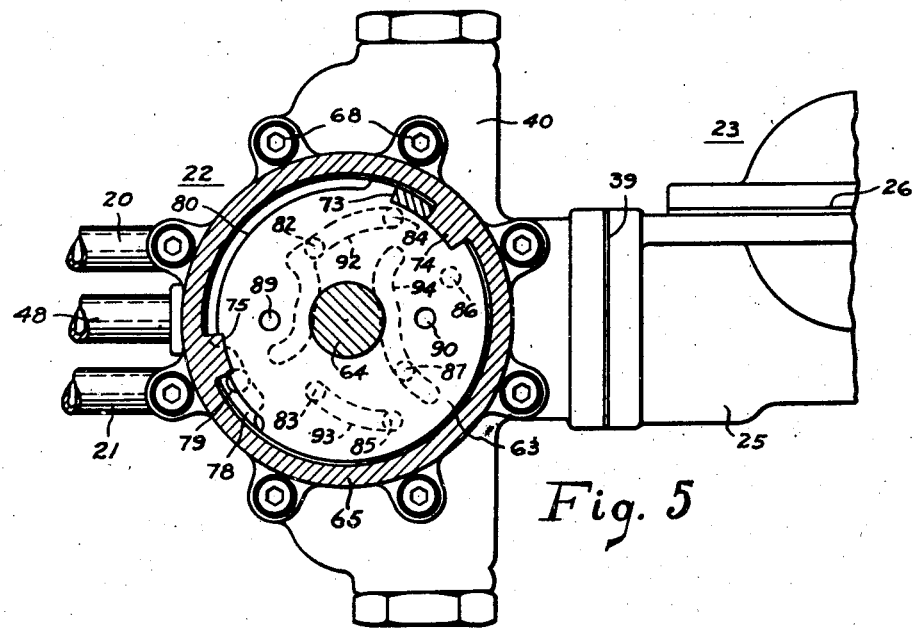
Fig. 5 is a section on the line 5—5 of Fig. 3.
Figure 8:
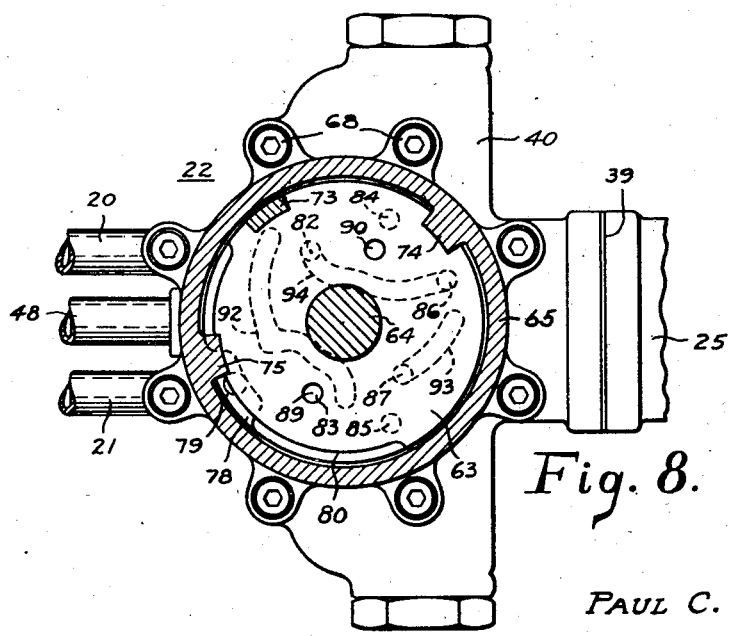
Fig. 8 is a sectional view similar to Fig. 5, but showing the rotary valve in its "close" position.
Figure 9:
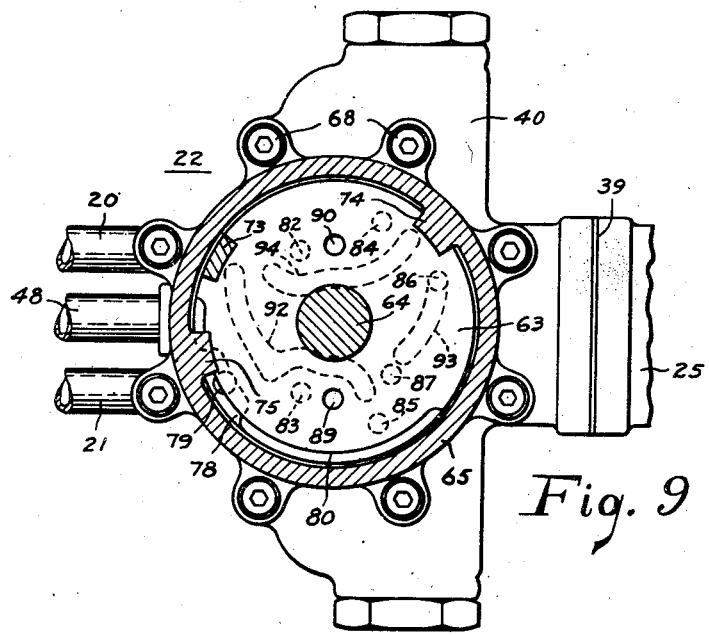
Fig. 9 is a sectional view similar to Fig. 5, but showing the rotary valve in its "stationary" position.
Figure 10:
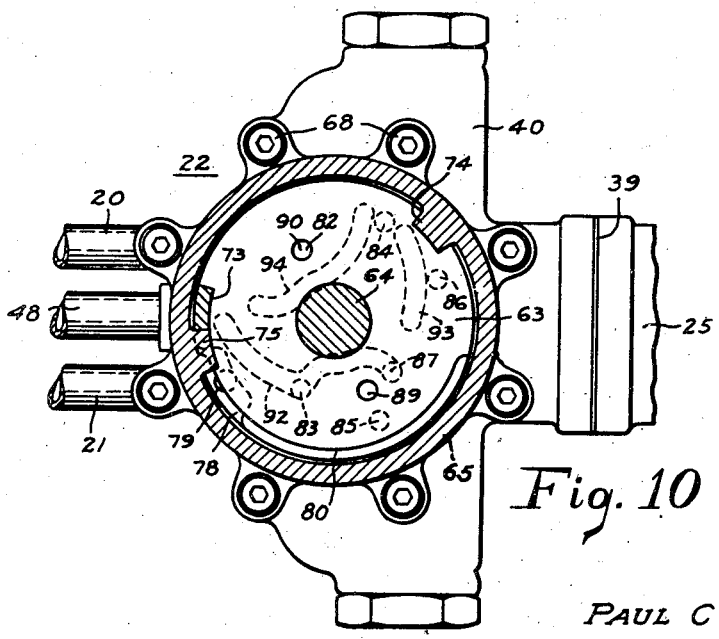
Fig. 10 is a sectional view similar to Fig. 5, but showing the rotary valve in its "open" position.

The front wall of the casing 40 is provided with an accurately finished plane front outer surface 62 (Fig. 3) which is engaged by a rotatable valve disk 63 having a central valve stem 64. The valve 63 is enclosed by a cup-shaped casing 65 having a central packing box 67 through which the stem 64 extends forwardly. The casing 65 is attached to the casing 40 by screws 68. A coiled compression spring 69 surrounds the packing box 67 and urges the valve 63 into contact with the surface 62. A handle 70 is attached to the front end of the stem 64 by means of a screw 71 and a suitable key (not shown), so that the valve 63 may be turned about its axis. This turning movement is preferably limited, and for this purpose a lug 73 (Fig. 5) is provided on the front surface of the valve 63 near the periphery thereof, and two lugs 74 and 75 are provided on the inner peripheral surface of the casing 40 in the path of the lug 73. This construction permits approximately 115 degrees of valve movement. When the valve is at its limit of travel in a clockwise direction, the lug 73 will engage the lug 74 (as shown in Fig. 5), this being what I call the "automatic" position of the valve. In Fig. 8 there is shown the "close" position of the valve, approximately 65 degrees from the "automatic" position. Fig. 9 illustrates the "stationary" position of the valve, approximately 90 degrees from the "automatic" position. Fig. 10 illustrates the "open" position of the valve, at the limit of its counterclockwise travel, as determined by engagement of the lug 73 with the lug 75. These four positions of the valve are indicated by a pointer 77 on the handle 70 (Fig. 2) in conjunction with the letters A, C, S and O on the front of the casing 65.

The manually operable valve 63 and its associated flat valve seat 62 are so constructed and arranged as to direct the fluid flow to the motor 18 in a desired manner dependent upon the valve position. Thus in the "automatic" position, the motor will control the main valve 16 automatically in accordance with the rate of flow in the main pipe 15, and in the "stationary" position the motor will hold the main valve fixed. With the valve 63 in its "open" or "close" positions, the motor will open or close the main valve 16, as the case may be, independently of the automatic valve mechanism.

Figure 6:
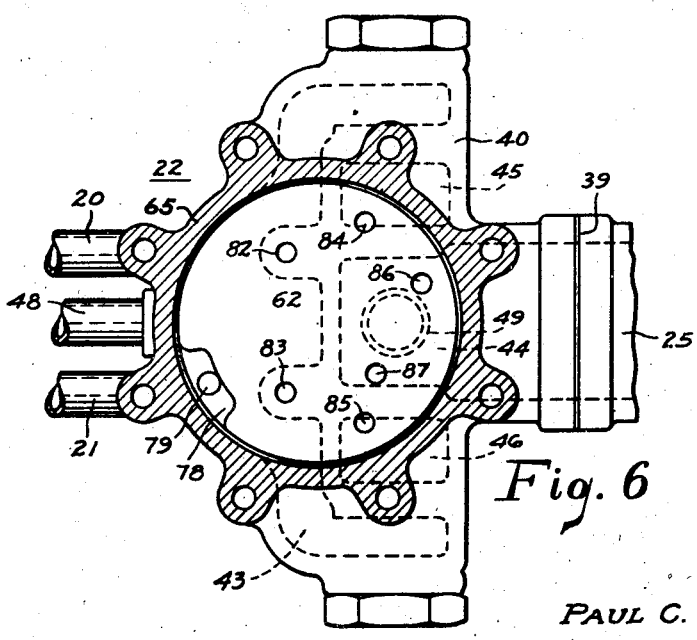
Fig. 6 is a section on the line 6—6 of Fig. 3.
Figure 7:
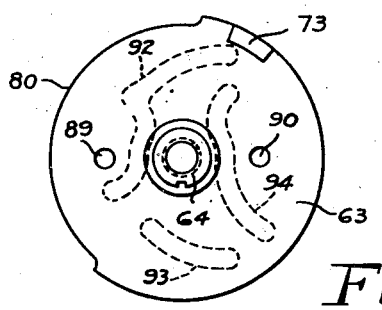
Fig. 7 is a detail of a rotary valve forming part of the regulator.

Referring now to Figs. 3, 5 and 6, a recess 78 is provided in the valve seat 62 adjacent the edge thereof, and a port 79 connects this recess with the inlet chamber 43. The edge of the valve disk 63 is cut back, as indicated at 80, to a somewhat smaller radius throughout an arcuate portion of the disk, so that the interior of the casing 65 will be in communication with the recess 78 regardless of the valve position. Consequently, the outer surface of the valve disk will be subjected at all times to the fluid pressure transmitted from the inlet chamber 43 through the port 79. The valve seat 62 is also provided with six ports 82, 83, 84, 85, 86 and 87 which lead rearwardly therefrom. The ports 82 and 83, which form the "motor" ports, connect at their rear ends with the pipes 20 and 21 respectively, these pipes leading to the opposite ends of the motor 18. The ports 84 and 85 form intermediate ports, which connect with the intermediate chambers 45 and 46 respectively. The ports 86 and 87 both connect with the exhaust chamber 44. The ports 82, 83 and 87 are equally spaced from the axis of the valve disk 63, and the ports 84, 85 and 86 are also equally spaced from this axis but at a somewhat greater distance than the ports of the first group.

The valve disk 63 is provided with certain ports which are arranged to cooperate in a desired manner with the ports in the valve seat. As shown, two ports 89 and 90 extend entirely through the disk 63 at opposite sides of the axis thereof and at the same distance from the axis as the ports 82, 83 and 87 in the valve seat. The disk 63 is also provided with three ports in the form of grooves 92, 93 and 94 in its rear face. These various ports are so located and shaped that with the disk in the "automatic" position shown in Fig. 5, the groove 92 will connect the ports 82 and 84, while the groove 93 will connect the ports 83 and 85; with the disk in the "close" position shown in Fig. 8, the port 89 will be aligned with the port 83, while the groove 94 will connect the ports 82 and 86; with the disk in the "stationary" position shown in Fig. 9, both the motor ports 82 and 83 will be closed by the disk; and with the disk in the "open" position shown in Fig. 10, the port 90 will be aligned with the port 82, while the groove 92 will connect the ports 83 and 87.

The operation of the invention will now be apparent from the above disclosure. By turning the handle 70 to place the valve disk 63 in the "automatic" position shown in Fig. 5, the intermediate chamber 45 will be connected with the upper end of the motor 18 through the ports 84, 92 and 82, and the pipe 20, whereas the intermediate chamber 46 will be connected with the lower end of the motor through the ports 85, 93, and 83, and the pipe 21. Consequently, if the rate of flow in the main pipe 15 changes even slightly, the resultant change in the differential pressure on the diaphragm 26 will move this diaphragm and its lever 37, actuating the spherical valves 55 and 56, and causing the motor 18 to move the main valve 16 in one direction or the other as may be required to restore the rate of flow to the correct value. If for any reason it is desired to control the main valve 16 manually, the operator need merely turn the handle 70 to bring the valve disk 63 into the proper position. Thus, in the "stationary" position of the valve shown in Fig. 9, the ports 82 and 83 will be closed, and no fluid can enter or leave the pipes 20 and 21 which connect these ports with the motor 18. Hence the motor and the valve 16 connected thereto will be held in a fixed position. In the "close" position of the valve 63 shown in Fig. 8, the inlet chamber 43 will be connected with the lower end of the motor 18 through the ports 79, 89 and 83, and the pipe 21. The upper end of the motor will be connected with the exhaust chamber 44 through the pipe 20 and the ports 82, 94 and 86. The motor piston will move upwardly, moving the main valve 16 toward its closed position. This movement can be stopped at any desired point by returning the handle 70 to the "stationary" position. Similarly, in the "open" position of the valve 63 shown in Fig. 10, the inlet chamber 43 will be connected with the upper end of the motor 18 through the ports 79, 90 and 82, and the pipe 20. The lower end of the motor will be connected with the exhaust chamber 44 through the pipe 21 and the ports 83, 92 and 87. The motor piston will move downwardly, moving the main valve toward its open position. By returning the handle 70 to the "stationary" position, the operator can stop the main valve at any point desired. It will be understood that when the handle 70 is moved away from the "automatic" position, movements of the diaphragm 26, lever 37, and the spherical valves 55 and 56 will have no effect on the operation of the motor 18.

The invention provides a relatively simple and compact apparatus whereby a device may be controlled either automatically or manually. The manual control makes it possible to move the device in either direction, and to hold the device stationary at any position desired within its limits of travel. A single handle is used to shift the control from automatic to manual, and to carry on the manual control. No more piping is required than would be needed for automatic regulation alone. It will be noted that the "stationary" position of the valve is intermediate the "open" and "close" positions, and the "automatic" position of the valve is located outside the range of travel of the valve in moving from the "open" to the "close" positions. Hence there is never any necessity for the valve to pass through the "automatic" position while it is being used to control the motor manually.

Having thus described my invention, what I claim as new and desire to secure by Letters Patent is:

1. A regulator adapted to control the flow of pressure fluid for operation of a fluid motor comprising a casing providing an inlet chamber, an exhaust chamber and two intermediate chambers, a valve mechanism whereby the inlet chamber may be connected to one intermediate chamber while the other intermediate chamber is connected to the exhaust chamber and vice versa, a device connected to the valve mechanism to actuate the same automatically in response to variations in a control impulse, means providing a valve seat, means providing two motor ports opening at one end into the valve seat and arranged for connection at their other ends with the motor to operate the same in opposite directions, two ports opening at one end into the valve seat and connected at their other ends with the respective intermediate chambers, and two ports opening at one end into the valve seat and connected at their other ends with the exhaust chamber, a manually operable valve having a surface in engagement with the valve seat, and walls enclosing the valve and seat to provide a valve chamber in communication with the inlet chamber, the valve having two ports extending therethrough and grooves in its said surface so arranged that when the valve is in one position the grooves will connect the motor ports with the respective intermediate ports, when the valve is in a second position one valve port will be aligned with one motor port while the other motor port is connected by one of the grooves with one exhaust port, when the valve is in a third position the said one motor port will be connected by one of the grooves with the other exhaust port while the other valve port is aligned with the said other motor port, and when the valve is in a fourth position it will close both the motor ports.

2. A regulator adapted to control the flow of pressure fluid for operation of a fluid motor comprising a casing providing an inlet chamber, an exhaust chamber and two intermediate chambers, a valve mechanism whereby the inlet chamber may be connected to one intermediate chamber while the other intermediate chamber is connected to the exhaust chamber and vice versa, a device connected to the valve mechanism to actuate the same automatically in response to variations in a control impulse, means providing a valve seat, means providing two motor ports opening at one end into the valve seat and arranged for connection at their other ends with the motor to operate the same in opposite directions, two ports opening at one end into the valve seat and connected at their other ends with the respective intermediate chambers, and one or more ports opening in to the valve seat and connected at their other ends with the exhaust chamber, a manually operable valve having a surface in engagement with the valve seat, and walls enclosing the valve and seat to provide a valve chamber in communication with the inlet chamber, the valve being movable to an "open" position, a "close" position, a "stationary" position between the open position and the close position, and an "automatic" position outside the range of travel of the valve in moving from the open position to the close position, the valve being so shaped and arranged that in the open position it will connect the valve chamber with one motor port and the exhaust chamber with the other motor port, in the close position it will connect the valve chamber with the said other motor port and the exhaust chamber with the said one motor port, in the stationary position it will close both the motor ports, and in the automatic position it will connect the motor ports with the respective intermediate ports.

3. A regulator adapted to control the flow of pressure fluid for operation of a fluid motor comprising a casing providing an inlet chamber, an exhaust chamber and two intermediate chambers, a valve mechanism whereby the inlet chamber may be connected to one intermediate chamber while the other intermediate chamber is connected to the exhaust chamber and vice versa, a device connected to the valve mechanism to actuate the same automatically in response to variations in a control impulse, means providing a flat valve seat, means providing two motor ports opening at one end into the valve seat and arranged for connection at their other ends with the motor to operate the same in opposite directions, two ports opening at one end into the valve seat and connected at their other ends with the respective intermediate chambers, and two ports opening at one end into the valve seat and connected at their other ends with the exhaust chamber, a manually rotatable valve having a flat face in engagement with the valve seat, and walls enclosing the valve and seat to provide a valve chamber in communication with the inlet chamber, the valve having two ports extending therethrough and grooves in its flat face so arranged that when the valve is in one position the grooves will connect the motor ports with the respective intermediate ports, when the valve is in a second position one valve port will be aligned with one motor port while the other motor port is connected by one of the grooves with one exhaust port, when the valve is in a third position the said one motor port will be connected by one of the grooves with the other exhaust port while the other valve port is aligned with the said other motor port, and when the valve is in a fourth position it will close both the motor ports.

PAUL C. TEMPLE.

REFERENCES CITED

The following references are of record in the file of this patent:

UNITED STATES PATENTS

| Number | Name | Date |
|---|---|---|
| 1,529,218 | Sandwell | Mar. 10, 1925 |
| 498,507 | Clark | May 30, 1893 |
| 1,694,143 | Roberts | Dec. 4, 1928 |
| 1,992,048 | Temple | Feb. 19, 1936 |

FOREIGN PATENTS

| Number | Country | Date |
|---|---|---|
| 658,833 | France | Jan. 28, 1929 |